Sept. 18, 1956     J. R. GRAVES     2,763,078
APPARATUS FOR PRODUCING COLORED DISPLAY PATTERNS
Filed Feb. 19, 1951     2 Sheets-Sheet 1
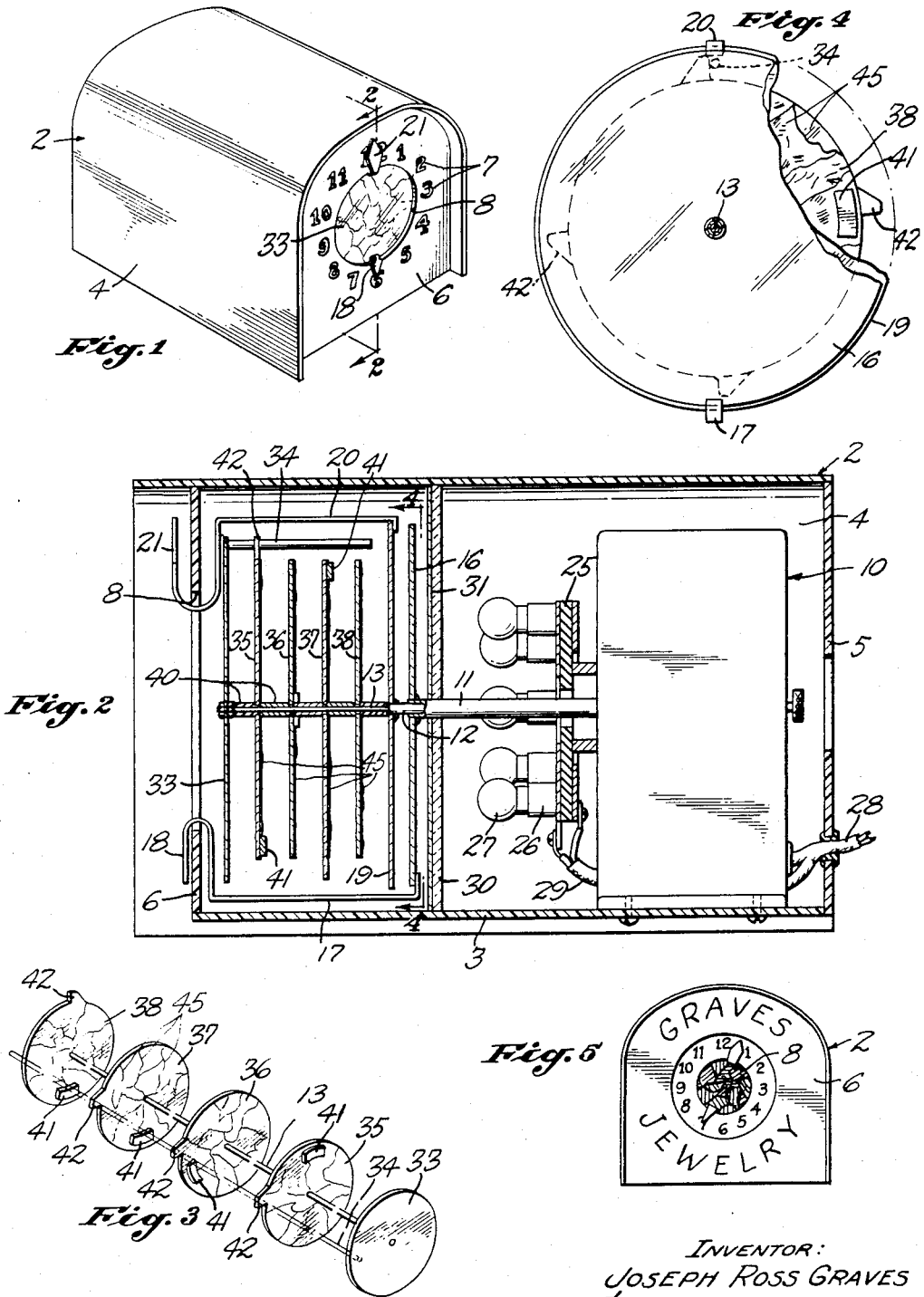
INVENTOR:
JOSEPH ROSS GRAVES
By Walter J. Stevenson
AGENT Sept. 18, 1956 J. R. GRAVES 2,763,078
APPARATUS FOR PRODUCING COLORED DISPLAY PATTERNS
Filed Feb. 19, 1951 2 Sheets-Sheet 2
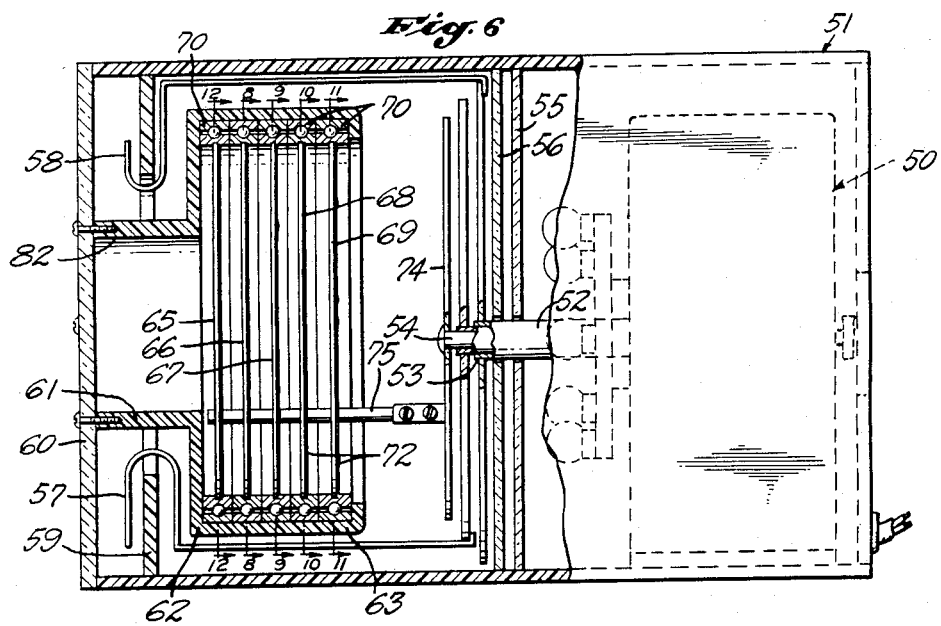
INVENTOR:
JOSEPH ROSS GRAVES
BY Walter J. Stevenson
AGENT

United States Patent Office 2,763,078
Patented Sept. 18, 1956

2,763,078

APPARATUS FOR PRODUCING COLORED DISPLAY PATTERNS

Joseph Ross Graves, Los Angeles, Calif.

Application February 19, 1951, Serial No. 211,722

11 Claims. (Cl. 40—130)

This invention relates generally to means for producing vari-colored displays, and more particularly to a kaleidoscopic device operative to produce a display consisting of a multiplicity of translucent pattern components of changing colors and configurations.

The present means are based generally on the theory that the placing of a thin birefringent crystal or a thin sheet of plastic birefringent material between two sheets of polarizing material at selected positions with respect to the directions of polarization in the two polarizing sheets, produces a translucent color effect. This phenomenon results from the fact that when a beam of light strikes a sheet of birefringent material it becomes divided into two plane-polarized beams, the vibration planes of which are arranged normal to each other. Since these beams travel through the birefringent sheet at unequal rates, a phase difference is effected between the vibrations of the two beams as they pass through the crystal or plastic material. The value of this phase difference for any given wave-length of light depends on the difference of the two velocities, and the length of the path through the sheet. Thus a beam of light is plane-polarized when it passes through the first sheet of polarizing material; on entering the birefringent sheet the beam is broken into two components polarized at right angles to one another and, on emerging from the sheet and entering the second sheet of polarizing material, these two components are resolved into one plane-polarized beam again. But a phase difference has been introduced between the two parts of this same beam, and so the necessary conditions for interference are present.

With a white light source, brilliant colors emerge from the device. The phase difference introduced depends on the difference of the two velocities in the birefringent sheet. This difference varies for the different wave-lengths of the spectrum, and so the various wave-lengths will emerge with different phase differences. Thus, when one wave-length emerges with a certain phase difference and is completely extinguished, another will emerge with another phase difference and will come through in full intensity, and so white light will be present with certain wave-lengths eliminated from it, which is equivalent to saying that it is colored light.

The present invention is concerned with such novelty display or advertising devices utilizing this principle of light transmission, and it is an important object to provide a device of this type which embodies means for intermittently varying the color scheme so as to effect relatively sudden changes in the pattern, such abrupt variations in the color patterns being eye-catching and thus drawing and retaining the attention of observers and prospective buyers of the merchandise advertised by the device.

Another object is to provide a display device which comprises a power-operated shaft or spindle; a source of light; a light-diffusing means disposed forwardly of the light source; a stationary Polaroid analyzer disc positioned forwardly of and adjacent the diffusing means; a polarizer disc of Polaroid located forwardly of and in spaced relation to the analyzer disc, said polarizer disc being operatively connected for rotation by the shaft, relative to said analyzer disc; the device further including a plurality of transparent, non-birefringent carrier discs or tumblers rotatably mounted coaxially of the shaft and carrying pieces of birefringent material, such as cellophane; and driving means operated by the shaft and engageable with the tumbler discs for intermittently rotating the latter in timed sequence so as to effect a constantly varying over-all color pattern of the light transmitted from the light source through the several aligned discs and intermittent and relatively abrupt changes in the color pattern due to the angular shifting of the pieces of the birefringent material of each tumbler disc with respect to those of the other tumbler discs.

Another object is to provide a device, of the nature referred to, in which the pieces of the birefringent material on the tumbler disc may be so arranged relative to one another that they provide a design of selected form, such as a star, rainbow, etc., when the discs assume a predetermined angular relation, once each rotative cycle.

Another object is to provide a display device which may be enclosed within a casing in which is located the electric clock, the casing having an opening at one end through which the changing color pattern is visible, and the clock having minute and hour hands which extend outwardly through the opening to register with dial numerals which surround the opening. A related object is to provide such a combined clock and display device in which the face of the casing may be provided with advertising indicia, to which the attention of persons is attracted by the changing color pattern.

A further object is to provide a device, of the character specified, in which the tumbler discs may be either freely supported by the rotary shaft or mounted for free rotation in a relatively large cylindrical bearing by means of anti-friction means.

Another object is to provide a simple, yet positive means for driving the tumbler discs through a portion of their complete rotation, this means comprising either (1) a pin carried by the polarizing disc and engageable with the shoulders of the tumbler discs, (2) a driving pin extending between a driving disc operated by a clock motor and the polarizing disc, the pin extending through arcuate slots in the tumbler discs, or (3) angularly related pins on the rotary shaft engageable with shoulders formed on hub portions of the tumbler discs.

Further objects will appear from the following description and from the drawings, which are intended for the purpose of illustration only, and in which:

Fig. 1 is a perspective view of a combined electric clock and display device constructed in accordance with my invention;

Fig. 2 is an enlarged longitudinal sectional view of the device;

Fig. 3 is a composite perspective view of the several tumbler discs and the polarizer disc employed in the device;

Fig. 4 is a cross-sectional view, taken on line 4—4 of Fig. 2;

Fig. 5 is a front view of the device, illustrating the use of advertising indicia on the face thereof;

Fig. 6 is a longitudinal sectional view through a display device of alternative construction;

Fig. 7 is a small scale face view of the same;

Figs. 8, 9, 10, and 11, are cross-sectional views, taken, respectively, on lines 8—8, 9—9, 10—10 and 11—11, of Fig. 6;

Fig. 8A is a view similar to Fig. 8, showing the first tumbler disc in its normal stationary position;

Fig. 12 is a cross-sectional view, taken on line 12—12 of Fig. 6;

Fig. 13 is a side view of a further alternative means for driving the tumbler discs;

Fig. 14 is a front view of the same; and

Fig. 15 is a perspective view of the rotary shaft employed in the embodiment of the invention illustrated in Fig. 13.

Referring first to Figs. 1 to 5 of the drawings in detail, the present novelty display and clock combination includes a casing or housing 2 which has a bottom wall 3, side walls 4, and a back wall 5, the casing being adapted to be made from any suitable material, but preferably from colored plastic. The casing is shown in Figs. 1 and 5 as embodied in specific shapes, but it will be apparent that it may take other forms, such as cylindrical, if desired. A front wall 6 of the casing constitutes a clock face or dial and is provided with clock numerals 7 which surround a central opening 8 in the wall, the changing color patterns, which are produced within the casing in the manner and by the means to be later described, being visible through this opening.

Mounted in any suitable manner within the rearward portion of the casing 2 is an electric clock 10 which is provided with an hour-hand actuating tube 11, a minute-hand actuating tube 12, and a second-hand shaft or spindle 13, the tubes and shaft being extended in length for the purpose to be hereinafter explained. Carried by the hour-hand tube 11 is a transparent plastic disc 16 to which is secured a strip 17, the latter extending forwardly and having a looped portion at its forward end overlying the edge of the opening 8, the extremity of the looped portion being disposed at the front face of the wall 6 and suitably shaped to provide the hour-hand 18 of the clock. The minute tube 12 of the clock 10 supports a transparent plastic minute disc 19 to which is secured a strip 20, the forward end of which terminates in a minute-hand 21. The forward loop portions of the minute-hand strip 20 and the hour-hand strip 17 are rotatable through orbits of different diameter to adapt them to pass by each other, the hour and minute-hands 18 and 21 registering with the clock numerals 7. The disc 16 and 19 may be of slightly birefringent material, such as cellulose acetate, if desired.

Mounted within the casing 2 by any suitable means is a holder 25 which carries a plurality of electric light sockets 26 having lamps 27, the latter being electrically connected to the wire 28 which supplies current to the electric clock 10, by means of a wire 29. A suitable electric switch (not shown) may be provided for selectively turning the electric lamps 27 on and off.

Disposed forwardly of the lamps 27 is a plate or partition 30, preferably of frosted glass, the partition serving as a light-diffusing medium. Arranged against the forward face of the light-diffuser plate 30 is a sheet 31 of light-polarized material, such as transparent glass, this sheet being stationary and hereinafter referred to as the analyzer element.

The seconds shaft or spindle 13 projects axially and forwardly from the minute-hand tube 12 to a position adjacent the front wall 6 of the casing 2. Secured to the forward end of the spindle 13 is a glass or plastic disc 33 of light-polarizing material, this disc being hereinafter referred to as the polarizer element. The element 33 carries a rearwardly projecting driving means, in the form of a pin 34.

Arranged between the polarizer element 33 and the disc 19 is a series of four tumbler discs 35, 36, 37, and 38, these discs being mounted for rotation relative to one another and relative to the shaft or spindle 13. The discs 35, 36, 37, and 38, which are made from non-birefringent material, such as glass or acrylic resin, are rotatable on the reduced ends of sleeves 40 which, in turn, are rotatable on the spindle 13. As shown best in Fig. 3, each tumbler disc has a weight 41 attached to its periphery. Each tumbler disc also has a projection or ear 42 on its periphery, the projection providing a shoulder adapted to be engaged by the driving pin 34 as the latter is revolved with the polarizer element 33. It is to be noted that the projections 42 and weights 41 of the individual tumbler discs are positioned at different points around the peripheries, that is, at different angles with respect to one another (Fig. 3). By this arrangement of the projections and weights, the driving pin 34 is adapted to engage the projections of the tumbler discs 35, 36, 37, and 38, and rotate the latter sucessively to a position where their weights move across top center. As each tumbler disc is thus rotated through a part rotation and its weight moves across top center, the weight is free to drop to bottom center, this action causing rapid rotation of the disc in clockwise direction, as viewed in Figs. 1 and 3. As the weight descends rapidly to its lower position, momentum carries it beyond bottom center, and the weight acts in the manner of a pendulum to swing each disc back-and-forth until the disc finally comes to rest with its weight disposed at bottom center position.

From the foregoing, it will be apparent that when the clock motor 10 is energized and the electric lamps 27 are lighted, the hour and minute-hands 18 and 21 are rotated to indicate time by registering with the dial numerals 7. At the same time, light emanating from the lamps 27 and passing through the diffuser plate 30 and the analyzer element 31 also travels through the aligned tumbler discs 35, 36, 37, and 38, and through the polarizer element 33 where it is visible through the opening 8.

As previously explained, when light is projected through a Polaroid analyzer element one or more thicknesses of birefringent material, such as cellophane, and a polarizer element, it is divided into two polarized beams, the vibration planes of which are arranged normal to each other and this produces a colored light patern, the colors and translucency of the pattern depending largely upon the number of thicknesses of the birefringent material, the particular way that the birefringent pieces are arranged in overlapping or folded relation, and the angles in which the grain lines of the pieces are disposed relative to the polarizing planes of the analyzer and polarizer elements. Since the pattern produced by this peculiar phenomenon may take an infinite variety of colors and shapes, no attempt is herein made to set forth an arrangement for effecting any particular pattern. For the purpose of illustration it is sufficient to explain that pieces 45 of birefringent material, such as cellophane, are applied to the transparent, non-polarized, non-birefringent, tumbler discs 35, 36, 37, and 38, the pieces having either single or multiple thicknesses, that is, unfolded or folded and non-overlapping or overlapping, one with another, as desired.

For the purpose of illustration, let it be assumed that the pieces 45 are of various sizes, some folded upon themselves, some overlapping others on the same disc, such haphazard arrangement of the birefringent pieces producing an irregular pattern made up of many shapes and colors and resembling a kaleidoscopic design. Since the diffused light beams travel through all the pieces on the several tumbler discs, it will be apparent that the light pattern produced is composed of a great number of components. Assuming, for the purpose of illustration, that the tumbler discs are held stationary, when the polarizer element 33 is rotated relative to these discs and to the analyzer element, the light emanating through the polarizer element and the opening 8 is in the form of a haphazard pattern composed of many components of various size, shape, and color. When the tumbler discs are stationary, the pattern changes constantly as the polarizer element is rotated, and it will be apparent that the pattern will be the same at any point in the rotation of the element. Thus, by arranging the birefringent pieces in predetermined locations and thicknesses, any selected pattern may be produced when the polarizer element assumes a predetermined position in its rotation.

The device referred to immediately above is now well known, see "Polarized Light and Its Application," Revised Edition, 1945, by Polaroid Corporation, Cambridge, Massachusets. While the present invention is based on a similar principle, it embodies a method and means for carrying the principle further so as to produce changing color patterns heretofore unobtainable. In the present display device, at least one of the tumbler discs, together with its pieces of birefringent material, is rotated with the polarizer element 33 and relative to the analyzer element 31 and the other tumbler discs and their pieces of birefringent material. It is obvious, therefore, that the color pattern is further divided into additional components and changing color schemes. As pointed out previously, the tumbler discs 35, 36, 37, and 38, are arranged to be rotated successively through approximately a half revolution through the engagement of the driving pin 34 with the angularly-spaced projections 42. Following such part rotation, each disc is rotated rapidly through the remaining half of its rotation by the action of its weight, which then serves as a pendulum to oscillate the disc.

By this sequence of operation, then, it may be said that the color pattern changes gradually at one stage in the operation, rapidly at the next stage, and fluctuates at the last stage of the cycle, and that the cycle is repeated, as each tumbler disc is brought into operation, to produce an entirely different color pattern, the change in pattern thus being intermittent. By properly spacing the projections 42 and weights 41 of the four tumbler discs, the latter are caused to be actuated in sequence, that is, a disc is tumbled each quarter revolution of the second-hand spindle 13, or each fifteen seconds. It will be apparent, therefore, at the end of each minute the produced pattern assumes the same shape and color scheme. Due to this fact, the birefringent pieces may be so cut and arranged as to result in a selected pattern, such as a star or other figure, at a particular point in the operative cycle.

The changing color patterns are especially pleasing and intriguing to an observer, and the device thus is especially adapted as a novelty display and advertising means, the device being provided with advertising indicia, as shown in Fig. 5, when desired. The changing color pattern attracts the eye and holds the attention and, due to the intermittent, abrupt changes in the pattern as effected by the tumbling discs, the device is particularly eye-catching. The display device may be set up at any location, and when it is to be mounted against a wall its over-all length will, of course, be considerably less than that shown in Figs. 1 and 2. While the present drawings illustrate the device as including the time indicating means 7, 18, 21, this portion of the device may be omitted, if desired.

Referring now to Figs. 6 to 12, the invention also contemplates a display device of alternative construction in which the tumbler discs are mounted for rotation at their peripheral edges so as to avoid the use of a central second shaft or spindle which may be seen through the opening of the casing. In this embodiment of the invention, the clock motor 50, disposed within the casing 51, has an hour tube 52, a minute tube 53, and a second shaft 54, these coaxial parts extending through the light-diffusing glass 55 and the polarized analyzer disc 56. The hour tube 52 carries an hour-hand 57 while the minute tube 53 carries a minute-hand 58, these hands registering with the clock numerals of the dial plate 59 which is visible through the transparent front wall 60 of the casing.

Secured to the wall 60 is the tubular portion 61 of a support member 62, the rearward annular portion 63 of which provides a bearing for a series of discs 65, 66, 67, 68, and 69. The bearing portion 63 supports the outer races of anti-friction bearings 70, the inner races receiving the peripheral edges of the several discs to mount the same for free rotation. The first or forward disc 65 is made from polarized material and is the polarizer element. The discs 66 to 69 are the tumbler discs to which is applied the pieces of birefringent material 72, the discs themselves being of non-birefringent material such as glass or acrylic resin.

The second shaft or spindle 54 carries a transparent driving disc 74 to which a driving pin 75 is secured. The pin 75 extends forwardly through arcuate openings 77 in the tumbler discs 66, 67, 68, and 69 (Figs. 8 to 11), the forward end of the pin extending through an aperture 78 in the polarizing element (Fig. 12). The leading end of each arcuate slot 77 in each tumbler disc provides an abutment or shoulder 80 against which the revolving pin 75 is adapted to engage to rotate each tumbler disc. Carried by each tumbler disc and disposed at different radial angles with respect to the shoulders 80 is a weight 81.

Light emanating from the electric lamps 83 is diffused by the glass 55 and passes through the aligned analyzer element 56, the tumbler discs 69, 68, 67, and 66, and the polarizer element 65, to be observed through the central opening 82 of the support member 62.

As the spindle 54 is rotated once each minute, the driving pin 75 acts to rotate the polarizing element 65 and the tumbler discs 66 to 69. Assuming that the tumbler discs are in the relative positions shown in Figs. 8 to 11, the pin 75 is in engagement with the shoulder 80 of the first disc 66, and since the weight 81 of this disc is at top center, as the disc is rotated through a small degree, the weight will pass across the center line and fall to the lower-most position, as shown in Fig. 8A, the relatively long arcuate slot 77 permitting this rotation of the disc with respect to the driving pin. As in the embodiment of the invention previously described, falling of the weight effects rapid rotation of the tumbler disc through a half revolution, and as the weight reaches bottom center position it acts in the manner of a pendulum to set up a momentary oscillatory movement of the disc.

Referring to Figs. 8 to 11, it will be seen that the shoulders and weights are so arranged that the discs 66, 67, 68, and 69, are tumbled in succession at each quarter revolution of the second shaft 54, the polarizer disc 65 and the driving pin 75, this cycle of operation being the equivalent of and producing the same result as that previously outlined in connection with the device shown in Figs. 1 to 5. Since the driving pin 75 travels in an orbit which is greater than the diameter of the opening 82, it is not visible therethrough. In addition, the alternative device avoids the use of a central shaft which might obscure the color display.

In Figs. 13, 14, and 15, I disclose a modified means for rotating the tumbler discs 90, 91, 92, and 93, which are rotatably mounted on the second shaft 94, and which carry weights 94'. The shaft 94 is provided with four radially projecting pins 95, 96, 97, and 98, which are adapted to engage the end shoulders 99 of slots 100 cut in the end faces of the hubs 101 of the tumbler discs. By this means, the pins 95, 96, 97, and 98, engage successively with the shoulders 99 of the respective tumbler discs 90, 91, 92, and 93, to rotate the latter in sequence for the purpose already explained.

It will be apparent from the foregoing that the exemplary embodiments shown are susceptible of various changes which will produce other variations in the color patterns produced. For example, the sationary analyzer disc may be composed of a plurality of pieces of polarized material, suitably joined together, the pieces being either regular or irregular in outline and arranged with their grain or polarizing axes disposed angularly with respect to one another.

While the display device has been disclosed as embodied in several preferred forms of construction, by way of example, it will be obvious that other modifications might be made in the construction without departing from the spirit of the invention. Consequently, I do not

I claim as my invention:

1. A device for producing display patterns of varying shape and color, comprising: a source of light; a stationary, polarized analyzer element; a polarizing element spaced from said analyzer element; at least one sheet of birefringent material interposed between said elements, light emanating from said source passing through said elements and said material and producing a color pattern observable through said polarizing element in a direction toward said light source; means for rotating said polarizing element at a constant speed; and means for rotating said birefringent material at variable speeds, said polarizing element and said birefringent material rotating on the same axis.

2. A device for producing display patterns of varying shape and color, comprising: a source of light; a stationary, polarized analyzer element; a polarizing element spaced from said analyzer element; at least one sheet of birefringent material interposed between said elements, light emanating from said source passing through said elements and said material and producing a color pattern observable through said polarizing element in a direction toward said light source; means for rotating said polarizing element on an axis at a constant speed; and means for rotating said birefringent material on the same axis alternately at slow and fast speeds.

3. A device for producing display patterns of varying shape and color, comprising: a source of light; a stationary, polarized analyzer element; a polarizing element spaced from said analyzer element; at least one sheet of birefringent material interposed between said elements, light emanating from said source passing through said elements and said material and producing a color pattern observable through said polarizing element in a direction toward said light source; means for rotating said polarizing element on an axis at a constant speed; and means for rotating said birefringent material on the same axis alternately at the same speed as, and at a faster speed than, that of said polarizing element.

4. A device for producing display patterns of varying shape and color, comprising: a source of light; a stationary, polarized analyzer element; a polarizing element spaced from said analyzer element; at least one sheet of birefringent material interposed between said elements, light emanating from said source passing through said elements and said material and producing a color pattern observable through said polarizing element in a direction toward said light source; means for rotating said polarizing element on an axis; and means for rotating said birefringent material on the same axis at variable speeds.

5. A device for producing display patterns of varying shape and color, comprising: a source of light; a stationary, polarized analyzer element; a polarizing element spaced from said analyzer element; at least one sheet of birefringent material rotatably mounted on an axis between said elements, light emanating from said source passing through said elements and said material and producing a color pattern observable through said polarizing element in a direction toward said light source; means for rotating said polarizing element on said axis at a constant speed; and a lost-motion connection between said means for driving said polarizing element and said birefringent material for rotating the latter at varying speeds.

6. A device as defined in claim 1 in which said sheet is carried by a transparent tumbler disc rotatable between said elements, said disc having an eccentric weight; and shoulder means on said disc engageable by said rotating means to effect rotation of said disc by said rotating means at the same speed as said polarizing element through a part of a revolution to cause said weight to move across top center, said weight being adapted, when so moved, to fall under the influence of gravity so as to rotate said disc at a faster rate of speed.

7. A device as defined in claim 1 which includes at least two transparent tumbler discs rotatable on an axis between said elements, each carrying an eccentric weight and a said sheet of said birefringent material, light emanating from said source passing through said elements, said discs and said birefringent material producing a color pattern observable through said polarizing element in a direction toward said light source, and in which said rotating means consists of driving means rotatable on said axis, and in which said means for rotating said birefringent material consists of shoulder means on said discs engageable by said driving means to effect rotation of said discs by said driving means at the same speed as said polarizing element through a part of revolution to cause said weights to move across top center, said weights being adapted, when so moved, to fall and thus rotate said discs at a faster rate of speed, said shoulder means of said discs being disposed at different circumferential distances from said weights so as to effect said faster rotation of said discs in sequence.

8. A device as defined in claim 1 which includes at least two transparent tumbler discs rotatable on an axis between said elements, each carrying an eccentric weight and a said sheet of said birefringent material, light emanating from said source passing through said elements, said discs and said birefringent material producing a color pattern observable through said polarizing element in a direction toward said light source, and in which said rotating means consists of driving means rotatable on said axis, and in which said means for rotating said birefringent material consists of shoulder means on said discs engageable by said driving means to effect rotation of said discs by said driving means at the same speed as said polarizing element through a part of a revolution to cause said weights to move across top center, said weights being adapted, when so moved, to fall and thus rotate said discs at a faster rate of speed, said shoulder means of said discs being disposed at different circumferential distances from said weights so as to effect said faster rotation of said discs in sequence, said shoulder means and said weight of each disc being so disposed relative to each other that said shoulder means is moved to a position in advance of said driving means upon falling of said weight, so as to cause said disc to assume a position of rest following each part revolution of the disc at said faster rate.

9. A device as defined in claim 1 which includes at least two transparent tumbler discs rotatable on an axis between said elements, each carrying an eccentric weight and a said sheet of said birefringent material, light emanating from said source passing through said elements, said discs and said birefringent material producing a color pattern observable through said polarizing element in a direction toward said light source, and in which said rotating means consists of driving means rotatable on said axis, and in which said means for rotating said birefringent material consists of shoulder means on said discs engageable by said driving means to effect rotation of said discs by said driving means at the same speed as said polarizing element through a part of a revolution to cause said weights to move across top center, said weights being adapted, when so moved, to fall and thus rotate said discs at a faster rate of speed, said shoulder means of said discs being disposed at different circumferential distances from said weights so as to effect said faster rotation of said discs in sequence, said shoulder means and said weight of each disc being so disposed relative to each other that said shoulder means is moved to a position in advance of said driving means upon falling of said weight, so as to cause said disc to assume a position of rest following each part revolution of the disc at said faster rate, said device also including an electric-clock motor having a second shaft operatively connected to said driving means.

10. A device as defined in claim 1 in which said sheet of birefringent material is carried by a transparent tumbler disc rotatable between said elements, said disc having an eccentric weight; a driving pin carried by said polarizer element; and shoulder means on said disc engageable by said driving pin to effect rotation of said disc by said polarizer element at the same speed as said polarizer element through a part of a revolution to cause said weight to move across top center, said weight being adapted, when so moved, to fall under the influence of gravity so as to rotate said disc at a faster rate of speed.

11. A device as defined in claim 1 which includes at least two transparent tumbler discs freely rotatable on a shaft between said elements, each disc carrying a said birefringent material, and an eccentric weight, light emanating from said source passing through said elements, said discs and birefringent material thereon producing a color pattern observable through said polarizing element in a direction toward said light source, said polarizing element being carried by said shaft, and in which said means for rotating the birefringent material consists of a shoulder on each of said discs and driving pins carried by said shaft and projecting radially therefrom, each pin being engageable with a said shoulder of a said disc to effect rotation of the disc at the same speed as said polarizing element through a part of a revolution to cause said weights to move across top center, said weights being adapted, when so moved, to fall and thus rotate said discs at a faster rate of speed, said shoulders of said discs being disposed at different circumferential distances from said weights so as to effect said faster rotation of said discs in sequence.

References Cited in the file of this patent

UNITED STATES PATENTS

| | | |
|---|---|---|
| 738,281 | Bell | Sept. 8, 1903 |
| 1,547,864 | Etcheto | July 28, 1925 |
| 1,572,097 | Walters | Feb. 9, 1926 |
| 1,579,165 | Tiencken | Mar. 30, 1926 |
| 1,711,790 | Johnson | May 7, 1929 |
| 1,818,590 | Trottman | Aug. 11, 1931 |
| 1,926,467 | Vernon | Sept. 12, 1933 |
| 2,261,957 | Burchell | Nov. 11, 1941 |
| 2,393,968 | Burchell | Feb. 5, 1946 |
| 2,506,134 | Burchell | May 2, 1950 |
| 2,535,781 | Burchell | Dec. 26, 1950 |

FOREIGN PATENTS

| | | |
|---|---|---|
| 310,130 | Italy | July 28, 1933 |